(12) United States Patent
Ohara et al.

(10) Patent No.: US 11,383,519 B2
(45) Date of Patent: Jul. 12, 2022

(54) LIQUID STORAGE BOTTLE AND METHOD OF MANUFACTURING THE SAME

(71) Applicant: CANON KABUSHIKI KAISHA, Tokyo (JP)

(72) Inventors: Manabu Ohara, Kawasaki (JP); Kenta Udagawa, Tokyo (JP); Hiroki Hayashi, Kawasaki (JP); Hiroshi Koshikawa, Yokohama (JP); Noriyasu Nagai, Tokyo (JP); Shoki Takiguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 269 days.

(21) Appl. No.: 16/820,468

(22) Filed: Mar. 16, 2020

(65) Prior Publication Data

US 2020/0307224 A1 Oct. 1, 2020

(30) Foreign Application Priority Data

Mar. 27, 2019 (JP) .............................. JP2019-060998
Jan. 29, 2020 (JP) .............................. JP2020-012530

(51) Int. Cl.
*B41J 2/175* (2006.01)
*B29C 65/00* (2006.01)
*B29C 65/06* (2006.01)
*B29L 31/00* (2006.01)

(52) U.S. Cl.
CPC ........... *B41J 2/175* (2013.01); *B29C 65/0672* (2013.01); *B29C 66/522* (2013.01); *B29L 2031/7158* (2013.01)

(58) Field of Classification Search
CPC ...... B41J 2/175; B41J 2/17509; B41J 2/1754; B41J 2/17553; B41J 29/02; B41J 29/13; B29C 65/0672; B29C 65/7829; B29C 66/1222; B29C 66/1224; B29C 66/12445; B29C 66/12469; B29C 66/12821; B29C 66/12841; B29C 66/322; B29C 66/522;
(Continued)

(56) References Cited

U.S. PATENT DOCUMENTS 6,712,232 B2 * 3/2004 Tanaka ..................... B65D 3/12
220/660
7,434,702 B2 * 10/2008 Yaita ..................... B65D 11/04
220/616

FOREIGN PATENT DOCUMENTS

CN 1434763 A 8/2003
CN 10120020 A 6/2008
CN 102990925 A 3/2013
(Continued)

*Primary Examiner* — Anh T Vo
(74) *Attorney, Agent, or Firm* — Canon U.S.A., Inc. IP Division

(57) ABSTRACT

A liquid storage bottle includes a bottle body having a resin-made first cylindrical part at one end, the first cylindrical part having an opening at its front end, and a tubular nozzle for pouring out the liquid contained in the inside of the bottle body by way of the opening, the tubular nozzle having a resin-made second cylindrical part bonded to the bottle body. The inner peripheral surface of the second cylindrical part is welded to the outer peripheral surface of the first cylindrical part. The outer peripheral surface of the first cylindrical part is provided with an annular groove extending in the circumferential direction and the annular groove is made to contain a part of the resin that is molten during the bonding operation.

14 Claims, 8 Drawing Sheets

(58) Field of Classification Search
CPC .............. B29C 66/5344; B29C 66/542; B29C 66/73921
See application file for complete search history.

(56) References Cited

FOREIGN PATENT DOCUMENTS

| | | | | |
|---|---|---|---|---|
| CN | 205745475 U | 11/2016 | | |
| JP | 2001322172 | * 11/2001 | ......... | B29C 65/0672 |
| JP | 2018-84735 A | 5/2018 | | |

* cited by examiner

LIQUID STORAGE BOTTLE AND METHOD OF MANUFACTURING THE SAME

BACKGROUND OF THE DISCLOSURE

Field of the Disclosure

The present disclosure relates to a liquid storage bottle for containing liquid in the inside thereof and also to a method of manufacturing the same.

Description of the Related Art

Liquid storage tanks to be used in liquid ejecting apparatus such as inkjet recording apparatus include those that can be refilled with liquid from a separately prepared liquid storage bottle by way of an inlet port for liquid injection. Such a liquid storage bottle adapted for refilling (referred to as "liquid refill bottle" in the below) is desirably prepared by welding a resin-made nozzle to a bottle body that is also made of a resin material so as to hermetically seal the bottle in order to minimize the risk of wetting the user's hands and some of the objects found around the bottle with the liquid content of the bottle. As a method to be used for preparing such a liquid refill bottle including a bottle body and a nozzle, spin welding technique, which comprises turning two cylindrical resin-made components of relative to each other, while holding them in contact with each other, and welding them together by means of the frictional heat generated in the contact area of the two components, is known. However, when welding the resin components by spin welding to make a product, measures need to be taken to prevent the appearance of the product from being degraded by the molten resin produced by the frictional heat and coming out to the outside and also prevent the features of the bottle from being degraded by the molten resin getting into the inside of the bottle. Japanese Patent Application Laid-Open No. 2018-84735 describes a technique of utilizing part of an annular groove, which annular groove is formed around the opening of a cabinet to receive a cylindrical cap so as bond the cap to the cabinet by spin welding, as space for containing unnecessarily produced molten resin.

However, the technique of Japanese Patent Application Laid-Open No. 2018-84735 requires an operation of forming a groove into which the cap is to be inserted and hence the cabinet has to be provided with a space for forming the groove to in turn limit the degree of design freedom of the container.

SUMMARY OF THE DISCLOSURE

An aspect of the present disclosure is to provide a liquid storage bottle that is free from degradation of appearance and features due to spin welding and also free from limitations of the degree of design freedom that can result from spin welding.

The above-identified aspect of the present disclosure is achieved by providing a liquid storage bottle including a bottle body having a resin-made first cylindrical part at one end, the first cylindrical part having an opening at its front end and an outer peripheral surface; and a tubular nozzle for pouring out the liquid contained in the inside of the bottle body by way of the opening, the tubular nozzle having a resin-made second cylindrical part bonded to the first cylindrical part, the second cylindrical part having an inner peripheral surface; the inner peripheral surface of the second cylindrical part being welded to the outer peripheral surface of the first cylindrical part; the outer peripheral surface of the first cylindrical part facing the inner peripheral surface of the second cylindrical part being provided with an annular groove extending in the circumferential direction, the annular groove containing at least either some of the resin employed to form the first cylindrical part or some of the resin employed to form the second cylindrical part; the first cylindrical part having a first contact surface continuously and outwardly extending in all radial directions from an axial base of the outer peripheral surface, the second cylindrical part having a second contact surface continuously and outwardly extending in all radial directions from an axial base of the inner peripheral surface, the first contact surface contacting the second contact surface; the resin-containing groove being located between the welded region of the outer peripheral surface of the first cylindrical part and the inner peripheral surface of the second cylindrical part and the contact region of the first contact surface and the second contact surface.

Further features and aspects of the present disclosure will become apparent from the following description of example embodiments with reference to the attached drawings.

BRIEF DESCRIPTION OF THE DRAWINGS

FIG. 7A schematically illustrates the bottle body and the nozzle that are being welded to each other and FIG. 7B schematically illustrates the bottle body and the nozzle that have already been welded to each other.

DESCRIPTION OF THE EMBODIMENTS

Figure 1:
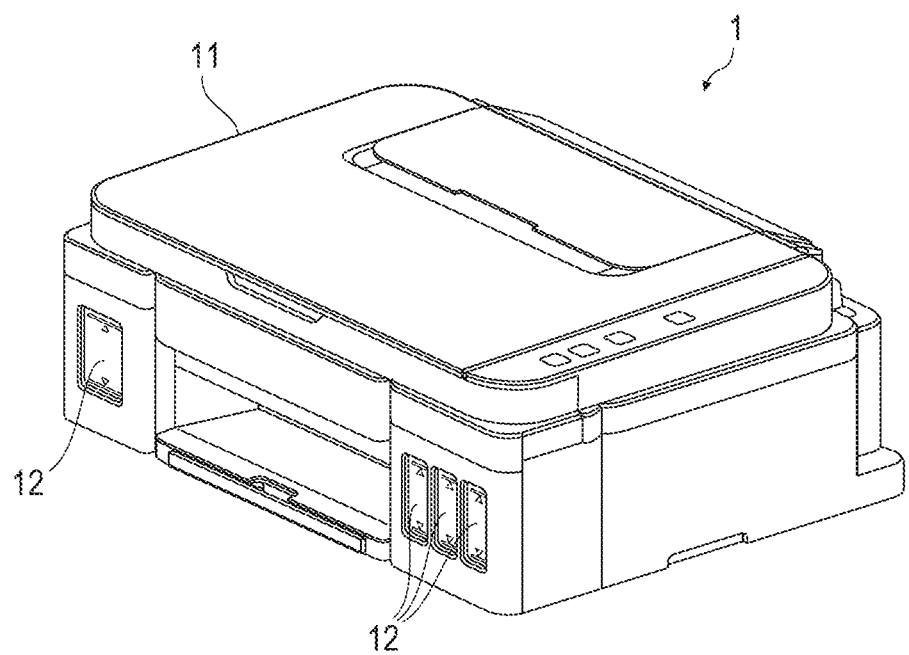
FIG. 1 is a schematic perspective view of an example liquid ejecting apparatus in which a liquid storage bottle according to the present disclosure is employed.

Various embodiments, features and aspects of the present disclosure will be described in detail below by referring to the accompanying drawings. While a liquid storage bottle according to the present disclosure will be described below in terms of an instance where it is employed to refill a liquid ejecting apparatus (inkjet recording apparatus) with liquid (ink), the application of a liquid storage bottle according to the present disclosure is not limited to such an instance. Note that the same component is denoted by the same reference numeral throughout the description given below by referring to the drawings and may not be described repeatedly.

FIG. 1 is a schematic perspective view of an example liquid ejecting apparatus in which a liquid storage bottle according to the present disclosure is employed, showing how the apparatus appears.

The liquid ejecting apparatus 1 is a serial type inkjet recording apparatus that includes a cabinet 11 and four large capacity liquid tanks 12 (corresponding to 12a, 12b, 12c, 12d in FIG. 2) arranged in the inside of the cabinet 11. The liquid tanks 12 are for containing liquid, which is ink, to be ejected to a recording medium (not shown).

Figure 2:
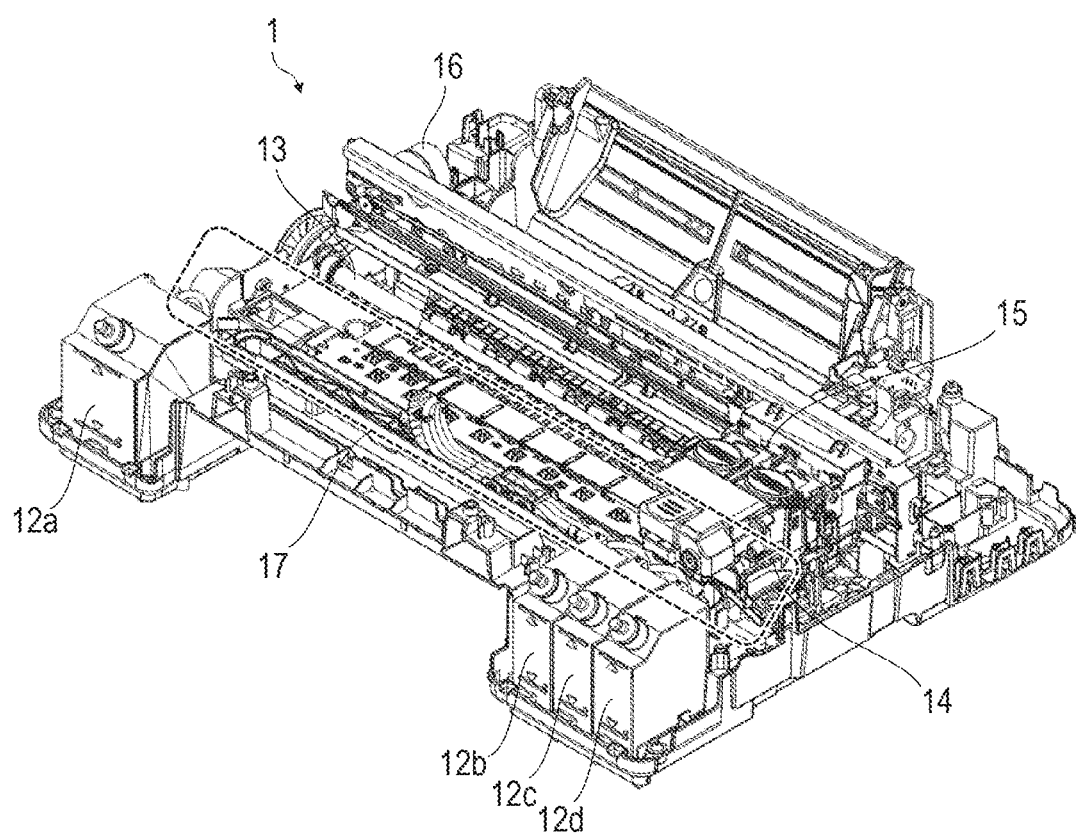
FIG. 2 is a schematic perspective view of a principal part of the liquid ejecting apparatus of FIG. 1, illustrating the internal configuration thereof.

FIG. 2 is a schematic perspective view of the liquid ejecting apparatus 1 of FIG. 1 in a state where the cabinet 11 is taken out so as to make the internal configuration of the apparatus main body visible.

The liquid ejecting apparatus 1 includes a conveyance roller 13 for conveying a recording medium (not shown), a carriage 15 equipped with a recording head 14 for ejecting liquid and a carriage motor 16 for driving the carriage 15. While the recording medium may typically be a sheet of paper, it is by no means limited to a sheet of paper so long as an image can be formed on the recording medium by the liquid (ink) ejected from the recording head 14. The recording medium is intermittently conveyed in the sub-scanning direction as the conveyance roller 13 is driven to rotate intermittently. As the carriage motor 16 is driven to rotate, the carriage 15 is driven to reciprocate in the main-scanning direction that intersects the recording medium conveyance direction (i.e. the sub-scanning direction). As liquid (ink) is ejected from ejection ports arranged in the recording head 14 onto the recording medium during the reciprocating and scanning operation of the carriage 15 and the recording head 14, an image is recorded on the recording medium.

Liquid (ink) is contained in the liquid tanks 12 and supplied to the recording head 14 by way of the liquid flow paths (that include respective liquid supply tubes arranged in the region surrounded by a dotted line in FIG. 2). Inks of four colors (e.g., black ink, cyan ink, magenta ink and yellow ink) are employed as liquid and four liquid tanks 12a, 12b, 12c, 12d are arranged as liquid tanks 12 to respectively store inks of the four colors. The four liquid tanks 12a through 12d are arranged on the front surface side of the liquid ejecting apparatus and in the cabinet 11.

Figure 3:
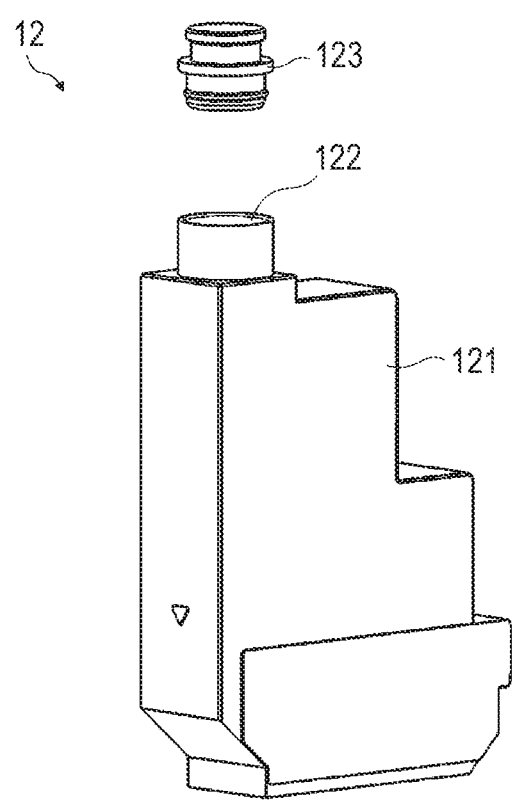
FIG. 3 is a schematic perspective view of one of the liquid tanks employed in the liquid ejecting apparatus of FIG. 1.

FIG. 3 is a schematic perspective view of one of the liquid tanks 12 arranged in the liquid ejecting apparatus 1 of FIG. 1, showing how the liquid tanks 12 appear.

Each of the liquid tanks 12 includes a tank body 121 for storing liquid (ink), an inlet port 122 that communicates with the liquid containing chamber in the inside of the tank body 121 and a tank cover 123 that can be mounted on the tank body 121 so as to cover the inlet port 122. Each of the liquid tanks 122 can be refilled with liquid (ink) after removing the tank cover 123 from the tank body 121 to thereby expose the inlet port 122. After the tank is refilled with liquid (ink), the tank cover 123 is put back onto the tank body 121 in order to minimize the evaporation of ink from the liquid containing chamber in the inside of the tank body 121.

Figure 4:
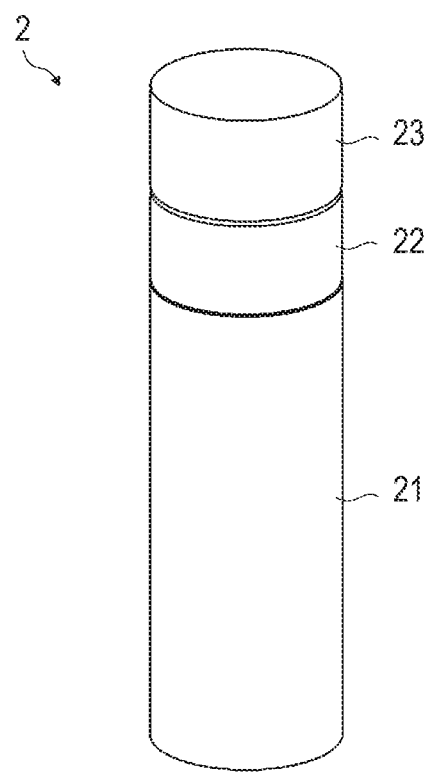
FIG. 4 is a schematic lateral view of the first example embodiment of liquid storage bottle according to the present disclosure.
Figure 5:
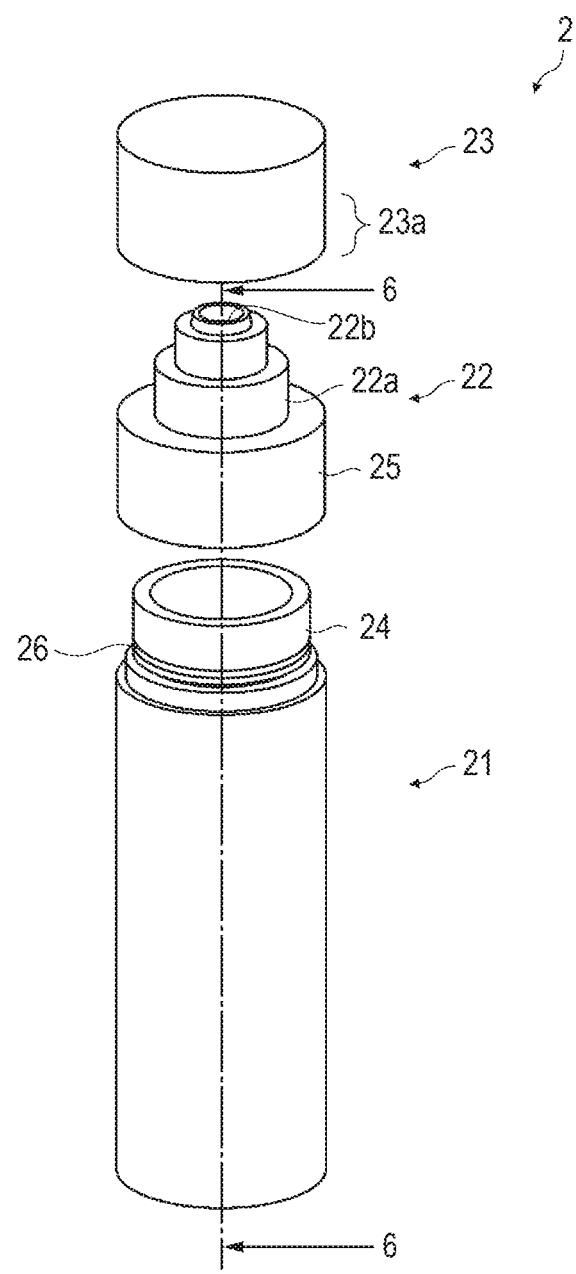
FIG. 5 is an exploded schematic perspective view of the liquid storage bottle shown in FIG. 4.

FIG. 4 is a schematic perspective view of an embodiment of liquid storage bottle 2 according to the present disclosure, showing how it appears. FIG. 5 is an exploded schematic perspective view of the liquid storage bottle 2 of FIG. 4 showing how the components of the liquid storage bottle 2 appear before they are assembled to produce the liquid storage bottle 2.

The liquid storage bottle 2 is a liquid (ink) container for refilling one of the liquid tanks 12 with liquid (ink) and includes a cylindrical bottle body 21 for containing liquid, one of whose opposite ends is open, a nozzle 22 and a cap 23. The nozzle 22 is connected and rigidly secured to the open end of the bottle body 21 and has a function of pouring out the liquid (ink) stored in the bottle body 21 through it. As will be described hereinafter, the cap 23 is removably put to the nozzle so as to close and open an outlet port 22b of the nozzle 22 and has a function of shielding the inside of the bottle body 21 against outer air and hermetically sealing the liquid storage bottle 2. Both the bottle body 21 and the nozzle 22 are resin components and the nozzle 22 is bonded and securely held to the bottle body 21 by welding in order to prevent the liquid in the liquid storage bottle 2 from leaking out through the interface of the resin components after bonding them to each other.

The open end of the bottle body 21 is formed as the bottle body side to-be-welded part 24 of the cylindrical bottle body and the side of the nozzle 22 facing the bottle body side to-be-welded part 24 of the bottle is formed as the nozzle side to-be-welded part 25 of the cylindrical nozzle. The inner peripheral surface of the nozzle side to-be-welded part 25 of the nozzle 22 is to be brought into contact with the outer peripheral surface of the bottle body side to-be-welded part 24 of the bottle body 21. As these two surfaces are bonded to each other by welding, the nozzle 22 becomes welded and securely bonded to the bottle body 21. A technique of spin welding is employed for the welding and bonding operation of this embodiment. The nozzle 22 has a nozzle side engaging section 22a at a central part thereof and the outlet port 22b for pouring out liquid (ink) at the front end thereof. The cap 23 has a cap side engaging section 23a and the cap 23 is mounted on the nozzle 22 as the cap side engaging section 23a becomes engaged with the nozzle side engaging section 22a. The objective of using the cap 23 is to minimize the risk of scattering of liquid and damaging any of the components of the liquid storage container when the container is unintentionally dropped or otherwise subjected to impact. Therefore, the way how the cap 23 is put on the nozzle 22 is not subject to any particular limitations so long as the above-described objective of using the cap is achieved. With an exemplar technique of securely putting the cap 23 onto the nozzle 22, a male screw thread is cut on the outer peripheral surface of the nozzle side engaging section 22a so as to make the nozzle operate as male screw, while a female screw thread is cut on the inner peripheral surface of the cap side engaging section 23a so as to make the cap operate as female screw, and the cap is screwed onto the nozzle.

Note that the bottle body side to-be-welded part 24 is provided with a groove 26, which will be described in greater detail hereinafter.

Figure 6:
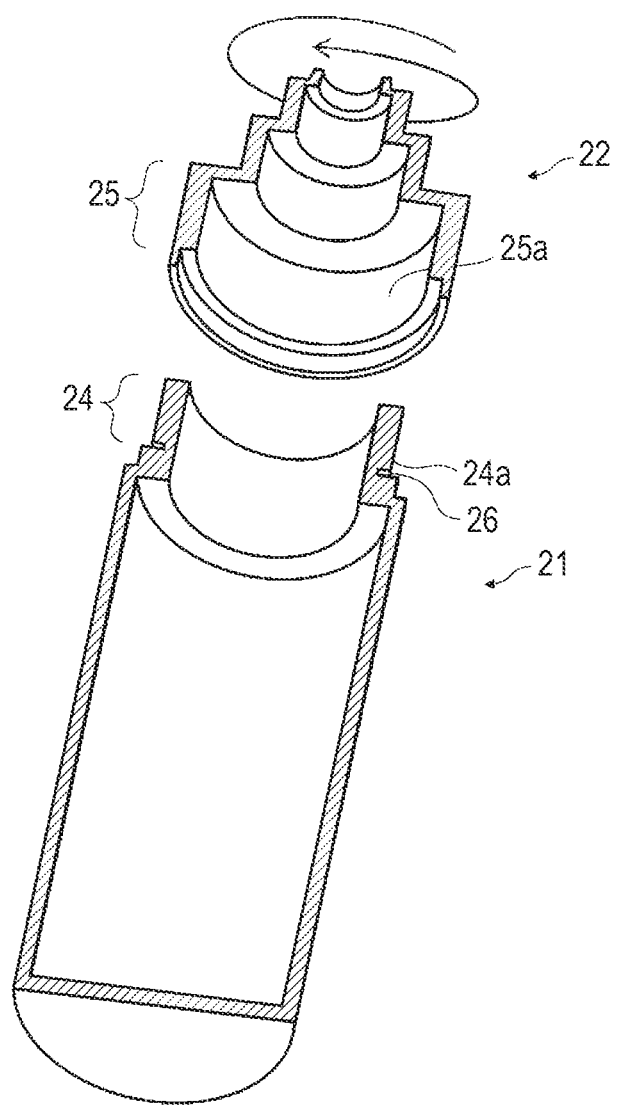
FIG. 6 is an exploded schematic perspective cross-sectional view of the liquid storage bottle of FIG. 4 taken along line 6-6 in FIG. 5, illustrating the method of spin welding the bottle body and the nozzle.

FIG. 6 is an exploded schematic cross-sectional perspective view of the liquid storage bottle of FIG. 4 taken along line 6-6 in FIG. 5, illustrating how the bottle body and the nozzle are bonded to each other by spin welding.

As pointed out above, the bottle body 21 and the nozzle 22 are bonded to each other by spin welding. More specifically, the bottle body 21 and the nozzle 22 are driven to rotate relative to each other and the bottle body side to-be-welded part 24 is inserted into the nozzle side to-be-welded part 25 so as to make them to be securely engaged with each other while the outer peripheral surface 24a of the bottle body side to-be-welded part (the first cylindrical part) 24 and the inner peripheral surface 25a of the nozzle side to-be-welded part (the second cylindrical part) 25 are held in contact with each other. At this time, frictional heat is generated between the outer peripheral surface 24a of the bottle body side to-be-welded part 24 and the inner peripheral surface 25a of the nozzle side to-be-welded part 25 and the generated frictional heat is utilized to melt the resin of the outer peripheral surface 24a of the bottle body side to-be-welded part 24 and the resin of the inner peripheral surface 25a of the nozzle side to-be-welded part 25. Then, as a result, the bottle body 21 and the nozzle 22 are welded and bonded to each other.

Figure 7A:
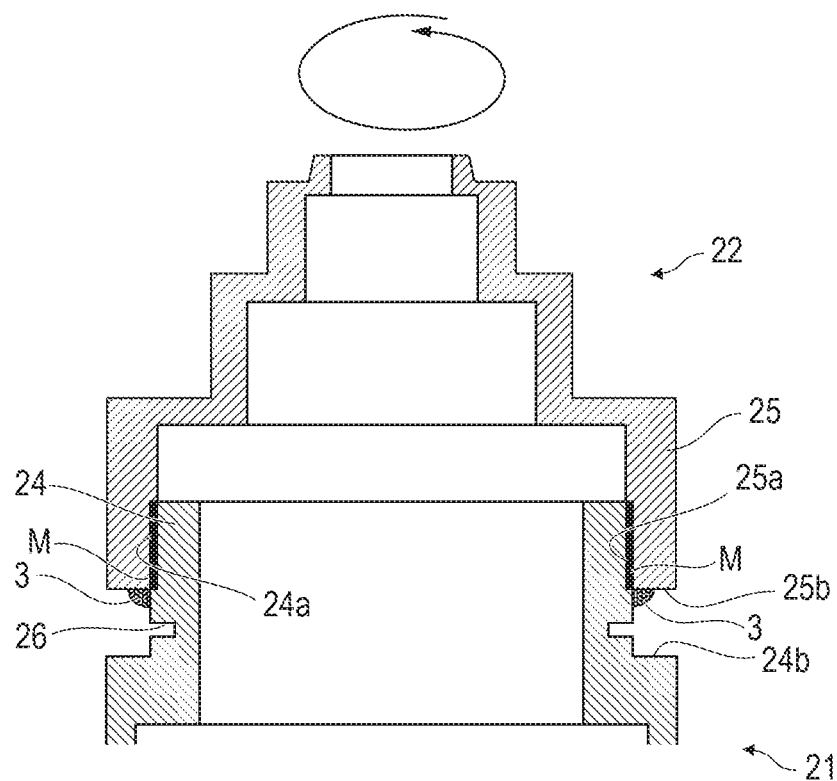
FIGS. 7A and 7B are schematic cross-sectional views of the liquid storage bottle of FIG. 4, illustrating the method of spin welding the bottle body and the nozzle.
Figure 7B:
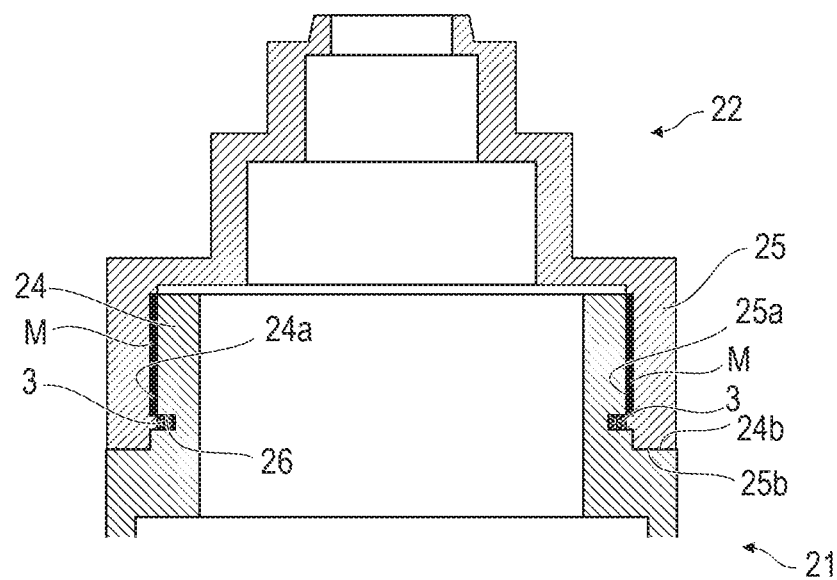

FIGS. 7A and 7B are enlarged schematic cross-sectional views of a part of the liquid storage bottle of this embodiment, sequentially illustrating how the bottle body and the nozzle are bonded to each other by spin welding. FIG. 7A schematically illustrates the bottle body and the nozzle that are being welded to each other and FIG. 7B schematically illustrates the bottle body and the nozzle that have already been welded to each other.

As the bottle body side to-be-welded part 24 is inserted into the nozzle side to-be-welded part 25, while the bottle body 21 and the nozzle 22 are being driven to rotate relative to each other, frictional heat is generated between the outer peripheral surface 24a of the bottle body side to-be-welded part 24 and the inner peripheral surface 25a of the nozzle side to-be-welded part 25 so that both the resin material of the outer peripheral surface 24a and the resin material of the inner peripheral surface 25a become molten (the molten part of the resin materials is denoted by M in FIG. 7A). The bottle body side to-be-welded part 24 has a first contact surface 24b that radially and continuously extends toward the outside from the axial end (base) of the outer peripheral surface 24a while the nozzle side to-be-welded part 25 has a second contact surface 25b that radially and continuously extends toward the outside from the corresponding axial end (base) of the inner peripheral surface 25a. Thus, the bottle body side to-be-welded part 24 is inserted into the nozzle side to-be-welded part 25 until the first contact surface 24b comes to contact the second contact surface 25b. As the first contact surface 24b and the second contact surface 25b come to contact each other, the welding operation ends and the bottle body 21 and the nozzle 22 are molten and bonded to each other at their contact surfaces to finish the process of manufacturing the liquid storage bottle 2.

In the above-described welding process, as the operation of inserting the bottle body side to-be-welded part 24 into the nozzle side to-be-welded part 25 is executed, the resin material of the bottle body and the resin material of the nozzle are partly molten and the molten resin 3 of the resin materials is pushed out onto the outer peripheral surface 24a of the bottle body side to-be-welded part 24 by the contact surface 25b. Note that the amount of the molten resin 3 can vary because both the dimensions of molded liquid storage bottles and the molding steps for forming liquid storage bottles by molding can involve variations, if only to a slight extent. In some instances, the molten resin can be pushed out to the outside of the liquid storage bottle 2. In view of the above-identified problem, in this embodiment, an annular groove 26 that extends in the circumferential direction is formed on the outer peripheral surface 24a of the bottle body side to-be-welded part 24 in order to contain the molten resin 3 that can excessively be produced and minimize the amount of the molten resin 3 that is pushed out to the outside. Because the bottle body 21 and the nozzle 22 are being driven to rotate relative to each other during the welding process, the molten resin 3 and other foreign objects, if any, that have a viscoelastic property eventually gets to the groove 26, while they are being subjected to shearing stress in the circumferential direction, and becomes wound to the inside of the groove 26 due to the tension generated by the shearing stress. In this way, the foreign objects including the molten resin 3 that are produced during the welding process (to be simply referred to as molten resin 3 hereinafter for the sake of convenience) can efficiently be trapped in the groove 26 to minimize the amount of the molten resin 3 that is pushed out to the outside of the liquid storage bottle 2.

When the welding process is finished, the groove 26 faces the inner peripheral surface 25a of the nozzle side to-be-welded part (which has now become the welded part) 25 and hence totally covered by the nozzle side welded part 25. Thus, the net effect of providing the bottle body side to-be-welded part 24 with a groove 26 is not only that the molten resin 3 that is produced in the welding process can reliably be prevented from being pushed out to the outside but also that the agreeable appearance of the product can be prevented from being undesirably damaged. Furthermore, in this embodiment, since it is sufficient that only the outer peripheral surface 24a of the bottle body side to-be-welded part 24 is provided with a groove 26, although there are two peripheral surfaces to be welded to each other including the outer peripheral surface 24a of the bottle body side to-be-welded part 24 and the inner peripheral surface 25a of the nozzle side to-be-welded part 25 and the outer peripheral surface 24a of the bottle body side to-be-welded part 24 is located on the inner peripheral side relative to the inner peripheral surface 25b of the nozzle side to-be-welded part 25. Thus, the degree of design freedom of the liquid storage bottle of this embodiment would not be lowered by providing such a groove 26.

The groove 26 is preferably arranged on the outer peripheral surface 24a of the bottle body side to-be-welded part 24 at a position located close to the axial end (base) that is directly connected to the first contact surface 24b. When the groove 26 is formed at such a position, the pushed out molten resin 3 can reliably and efficiently be collected in the groove 26 to minimize the amount of molten resin 3 that is pushed out to the outside. With the arrangement illustrated in FIGS. 7A and 7B, the outer peripheral surface 24a of the bottle body side to-be-welded part 24 and the inner peripheral surface 25a of the nozzle side to-be-welded part 25 are bonded to each other also under the groove 26 but the contact region of the outer peripheral surface 24a and the inner peripheral surface 25a that is located under the groove 26 is very small and hence molten resin 3 can be produced in the region only to a very small extent. If molten resin 3 is produced in the region, the molten resin 3 that can be pushed out to the outside of the liquid storage bottle 2 is blocked by the first contact surface 24b and the second contact surface 25b and would not actually be pushed out to the outside.

Note that the first contact surface 24b preferably extends perpendicularly relative to the outer peripheral surface 24a of the bottle body side to-be-welded part 24 and, accordingly, the second contact surface 25b also preferably extends perpendicularly relative to the inner peripheral surface 25a of the nozzle side to-be-welded part 25 from the viewpoint of maximizing the effect of blocking the molten resin 3 that tends to be pushed out to the outside of the liquid storage bottle 2. The position of the first contact surface 24b and that of the second contact surface 25b are not subject to any particular limitations so long as they are brought to contact each other so as to properly align the bottle body 21 and the nozzle 22. However, to remarkably realize the effect of blocking the molten resin 3 that can otherwise be pushed out to the outside, the first contact surface 24b is preferably connected to the outer peripheral surface 24a of the bottle side to-be-welded part 24 and made to radially outwardly extend from the outer peripheral surface 24a as in this embodiment. Thus, accordingly, the second contact surface 25b is preferably connected to the inner peripheral surface 25a of the nozzle side to-be-welded part 25 and made to radially outwardly extend from the inner peripheral surface 25a.

With the arrangement illustrated in FIGS. 7A and 7B, the first contact surface 24b and the second contact surface 25b may have not been welded to each other but the welding operation may be stopped when the first contact surface 24b and the second contact surface 25b are brought into contact with each other. Alternatively, the welding operation may be continued after the first contact surface 24b and the second contact surface 25b are brought into contact with each other until the first contact surface 24b and the second contact surface 25b are reliably welded to each other. If the welding operation is continued after the first contact surface 24b and the second contact surface 25b are brought into contact with each other until the first contact surface 24b and the second contact surface 25b are welded to each other, care should be taken so that the produced molten resin 3 would not be pushed out to the outside of the liquid storage bottle 2. If, on the other hand, the first contact surface 24b and the second contact surface 25b have not been welded to each other but the welding operation is stopped when the first contact surface 24b and the second contact surface 25b are brought into contact with each other and additionally, if not only molten resin 3 but also air are found in the groove 26, no problem will arise even when the air in the groove is expanded to give rise to an unexpected adverse effect because an escape route exists for the air.

Although not shown, preferably, the groove 26 is arranged at a position where the outer peripheral surface 24a is continuously extended to produce the first contact surface 24b. Then, no region where molten resin 3 exists is found under the groove 26. In other words, molten resin 3 may not be produced under the groove 26 so that any unexpected and hardly controllable trouble may not arise. Additionally, the air caught in the groove may be able to easily escape to the outside.

Figure 8A:
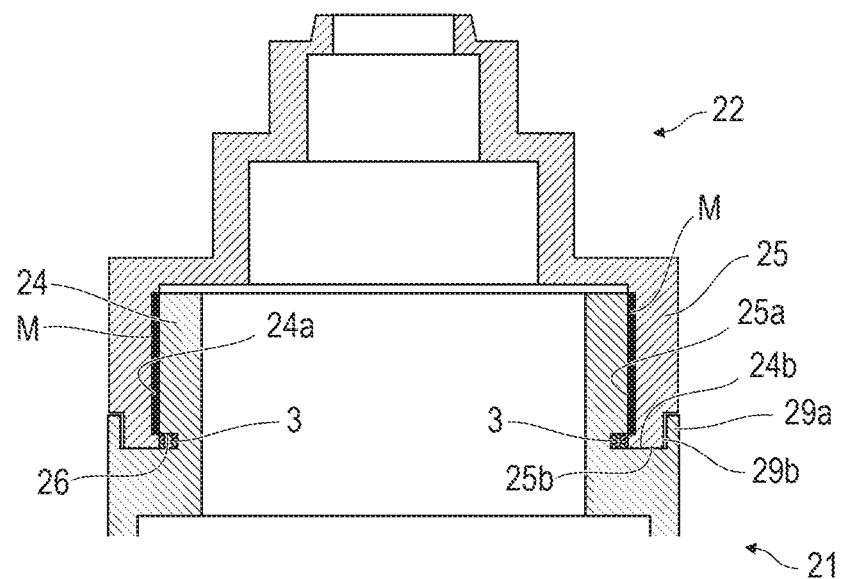
FIGS. 8A and 8B schematically illustrate two different sets of a bottle body and a nozzle obtained by modifying the bottle body and the nozzle shown in FIGS. 7A and 7B.
Figure 8B:
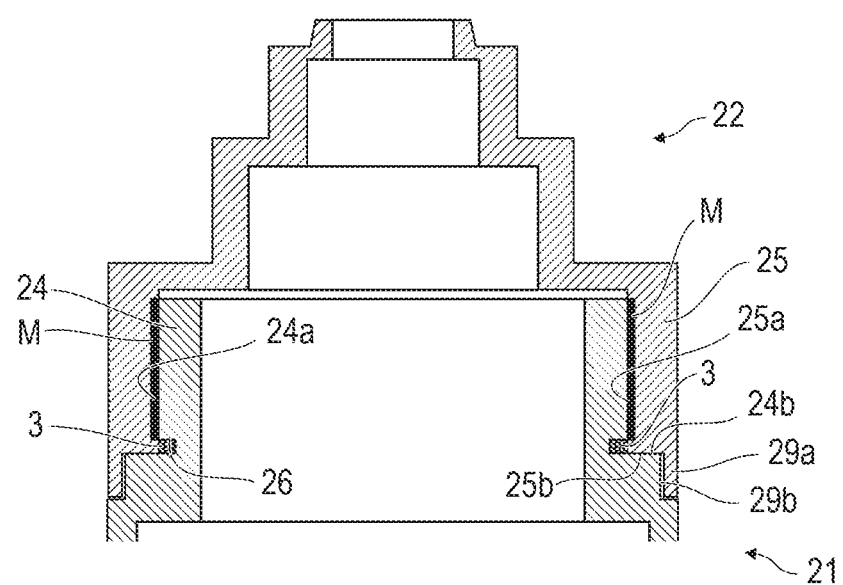

FIGS. 8A and 8B schematically illustrate two different sets of a bottle body and a nozzle obtained by modifying the bottle body and the nozzle shown in FIGS. 7A and 7B.

As shown in FIG. 8A, the first contact surface 24b may include an axially protruding portion 29a that is a cylindrical portion arranged radially outside relative to the first contact surface 24b and protruding in the axial direction. Since the welding process of welding the bottle body side to-be-welded part 24 and the nozzle side to-be-welded part 25 is continued until the first contact surface 24b and the second contact surface 25b contact each other, molten resin can be produced even from the contact surfaces 24b, 25b to a non-negligible extent. However, if molten resin is produced from the first contact surface 24b and the second contact surface 25b, it can be prevented from being exposed to the outside by the protruding portion 29a and hence the appearance of the liquid storage bottle 2 can be held agreeable. Note that such a protruding portion 29a may be provided either on the bottle body side to-be-welded part 24 or on the nozzle side to-be-welded part 25. In other words, a protruding portion 29a may alternatively be provided on the nozzle side to-be-welded part 25 as shown in FIG. 8B. Additionally, when either one of the bottle body side to-be-welded part 24 and the nozzle side to-be-welded part 25 is provided with a protruding portion 29a, the other one of the bottle body side to-be-welded part 24 and the nozzle side to-be-welded part 25 may be provided with an annular recessed portion 29b for receiving the protruding portion 29a for the purpose of maintaining the smooth appearance of the liquid storage bottle 2. The profile including the thickness of the protruding portion 29a is not subject to any particular limitations so long as it snugly and agreeably covers the first contact surface 24b and the second contact surface 26b and makes them invisible from the outside.

The groove 26 is provided for the purpose of collecting the molten resin 3 that can excessively be produced and therefore can collect air in addition to the molten resin 3. In view of this potential problem, the groove 26 is preferably made to have a lateral surface that continuously extends from the first contact surface 24b as shown in FIGS. 8A and 8B. With such an arrangement, no air is left on the welded interface of the bottle body side welded part 24 and the nozzle side welded part 25 so that the first contact surface 24b and the second contact surface 25b can more firmly be welded to each other.

Thus, according to the above-described present disclosure, there are provided a liquid storage bottle that is free from degradation of appearance and functions and also free from limitations of the degree of design freedom and a method of manufacturing the same.

While the present disclosure has been described with reference to example embodiments, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2019-060998 filed Mar. 27, 2019, and Japanese Patent Application No. 2020-012530, filed Jan. 29, 2020, which are hereby incorporated by reference herein in their entirety.

What is claimed is:
1. A liquid storage bottle comprising:
a bottle body having a resin-made first cylindrical part at one end, the first cylindrical part having an opening at its front end and an outer peripheral surface; and
a tubular nozzle for pouring out the liquid contained in the inside of the bottle body by way of the opening, the tubular nozzle having a resin-made second cylindrical part bonded to the first cylindrical part, the second cylindrical part having an inner peripheral surface;
the inner peripheral surface of the second cylindrical part being welded to the outer peripheral surface of the first cylindrical part;
the outer peripheral surface of the first cylindrical part facing the inner peripheral surface of the second cylindrical part being provided with an annular groove extending in the circumferential direction, the annular groove containing at least either some of the resin employed to form the first cylindrical part or some of the resin employed to form the second cylindrical part;
the first cylindrical part having a first contact surface continuously and outwardly extending in all radial directions from an axial base of the outer peripheral surface, the second cylindrical part having a second contact surface continuously and outwardly extending in all radial directions from an axial base of the inner peripheral surface, the first contact surface contacting the second contact surface;
the resin-containing groove being located between the welded region of the outer peripheral surface of the first cylindrical part and the inner peripheral surface of the second cylindrical part and the contact region of the first contact surface and the second contact surface.

2. The liquid storage bottle according to claim 1,
wherein the first contact surface extends continuously from and perpendicularly relative to the outer peripheral surface, and
wherein the second contact surface extends continuously from and perpendicularly relative to the inner peripheral surface.

3. The liquid storage bottle according to claim 1,
wherein the groove is arranged at the axial base of the outer peripheral surface of the first cylindrical part.

4. The liquid storage bottle according to claim 1,
wherein the groove has a lateral surface continuously extending from the first contact surface.

5. The liquid storage bottle according to claim 1,
wherein either one of the first contact surface and the second contact surface is provided with a cylindrical protruding portion that is axially protruding and located radially outside relative to the contact surface thereof.

6. The liquid storage bottle according to claim 5,
wherein the other one of the first contact surface and the second contact surface is provided with a recessed portion for receiving the protruding portion that is located radially outside relative to the contact surface thereof.

7. A method of manufacturing a liquid storage bottle comprising:
preparing a bottle body having a resin-made first cylindrical part at one end, the first cylindrical part having an opening at its front end, an outer peripheral surface provided with an annular groove extending in the circumferential direction relative to the outer peripheral surface, and a first contact surface continuously and radially outwardly extending from an axial base of the outer peripheral surface;
preparing a tubular nozzle having a resin-made second cylindrical part at one end, the second cylindrical part having an inner peripheral surface to be disposed to face and contact the outer peripheral surface of the first cylindrical part, and a second contact surface continuously and radially outwardly extending from an axial base of the inner peripheral surface so as to be disposed to face and contact the first contact surface; and
bonding the bottle body and the nozzle by means of spin welding by driving the bottle body and the nozzle to rotate relative to each other, while keeping the outer peripheral surface of the first cylindrical part and the inner peripheral surface of the second cylindrical part held in contact with each other, and inserting the bottle body into the nozzle down to the position where the first contact surface and the second contact surface contact each other,
wherein both the resin forming the first cylindrical part and the resin forming the second cylindrical part become molten by the frictional heat generated due to the contact and the relative rotational motion of the outer peripheral surface of the first cylindrical part and the inner peripheral surface of the second cylindrical part during the operation of relatively inserting the bottle body into the nozzle, a part of the molten resin being driven to move forward in the inserting direction by the inserting operation and contained in the groove during the bonding.

8. A resin component comprising:
a first member and a second member bonded to the first member,
wherein the first member has a resin-made first cylindrical part at one end, the second member having a resin-made second cylindrical part at one end, an inner peripheral surface of the second cylindrical part being welded to an outer peripheral surface of the first cylindrical part,
wherein the outer peripheral surface of the first cylindrical part faces the inner peripheral surface of the second cylindrical part being provided with an annular groove extending in the circumferential direction, the groove containing a part of the resin forming at least either the first cylindrical part or the second cylindrical part;
wherein the first cylindrical part has a first contact surface continuously and radially outwardly extending from an axial base of the outer peripheral surface thereof, the second cylindrical part having a second contact surface continuously and radially outwardly extending from an axial base of the inner peripheral surface thereof, the first contact surface and the second contact surface contacting each other, and
wherein the resin-containing groove is located between the region where the outer peripheral surface of the first cylindrical part and the inner peripheral surface of the second cylindrical part are welded to each other and the region where the first contact surface and the second contact surface contacting each other.

9. The resin component according to claim 8,
wherein the first contact surface extends perpendicularly relative to and continuously from the outer peripheral surface, and
wherein the second contact surface extends perpendicularly relative to and continuously from the inner peripheral surface.

10. The resin component according to claim 8,
wherein the groove is arranged at the axial base of the outer peripheral surface of the first cylindrical part.

11. The resin component according to claim 8,
wherein the groove has a lateral surface continuously extending from the first contact surface.

12. The resin component according to claim 8,
wherein either one of the first contact surface and the second contact surface is provided with a cylindrical protruding portion that is axially protruding and located radially outside relative to the contact surface.

13. The resin component according to claim 12,
wherein the other one of the first contact surface and the second contact surface is provided with a recessed portion for receiving the protruding portion that is located radially outside relative to the contact surface.

14. A method of manufacturing a resin component comprising:
preparing a first member having a resin-made first cylindrical part at one end, the first cylindrical part having an opening at its front end, an outer peripheral surface provided with an annular groove extending in the circumferential direction relative to the outer peripheral surface, and a first contact surface continuously and radially outwardly extending from an axial base of the outer peripheral surface;
preparing a second member having a resin-made second cylindrical part at one end, the second cylindrical part having an inner peripheral surface to be disposed to face and contact the outer peripheral surface of the first cylindrical part, and a second contact surface continuously and radially outwardly extending from an axial base of the inner peripheral surface so as to be disposed to face and contact the first contact surface; and
bonding the first member and the second member by spin welding by driving the first member and the second member to rotate relative to each other, while keeping the outer peripheral surface of the first cylindrical part and the inner peripheral surface of the second cylindrical part held in contact with each other, and inserting the first member into the second member down to the position where the first contact surface and the second contact surface contact each other;

wherein both the resin forming the first contact surface and the resin forming the second contact surface become molten by the frictional heat generated due to the contact and the relative rotational motion of the outer peripheral surface of the first cylindrical part and the inner peripheral surface of the second cylindrical part during the operation of relatively inserting the first member into the second member, a part of the molten resin being driven to move forward in the inserting direction by the inserting operation and contained in the groove.

\* \* \* \* \*